July 25, 1939.                J. B. STRAUSS                 2,167,034
                          RAPID TRANSIT SYSTEM
                          Filed Nov. 30, 1937           3 Sheets-Sheet 1

INVENTOR:
JOSEPH B. STRAUSS
BY *Baldwin Vale*
ATTORNEY.

July 25, 1939.   J. B. STRAUSS   2,167,034
RAPID TRANSIT SYSTEM
Filed Nov. 30, 1937   3 Sheets-Sheet 2

INVENTOR:
JOSEPH B. STRAUSS
BY Baldwin Yale
ATTORNEY

July 25, 1939.   J. B. STRAUSS   2,167,034
RAPID TRANSIT SYSTEM
Filed Nov. 30, 1937   3 Sheets-Sheet 3
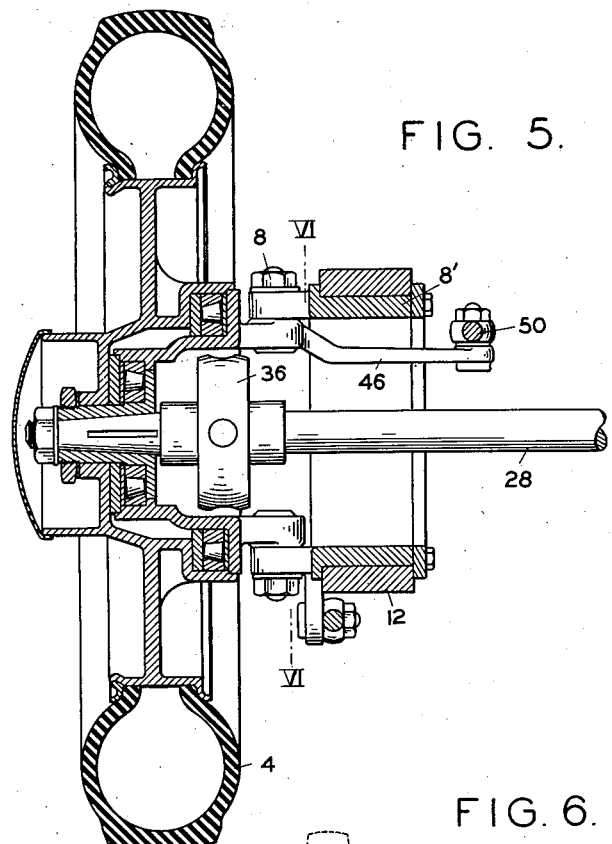
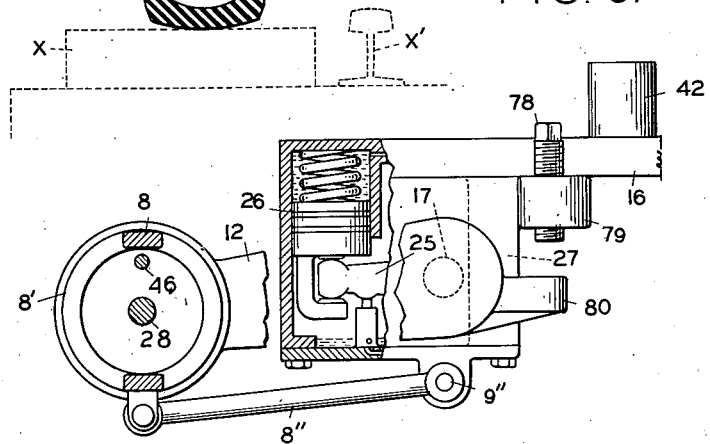
INVENTOR:
JOSEPH B. STRAUSS
BY
ATTORNEY.

Patented July 25, 1939

2,167,034

UNITED STATES PATENT OFFICE 2,167,034

RAPID TRANSIT SYSTEM

Joseph B. Strauss, San Francisco, Calif.; Annette Strauss, John Sparks, and Henry C. Clausen executors of said Joseph B. Strauss, deceased Application November 30, 1937, Serial No. 177,215

2 Claims. (Cl. 105—176)

This invention relates to improvements in rapid transit systems and more particularly to vehicles therefor.

Among the objects of the invention is to provide vehicles of the motorbus or motortruck types, adapted to interchangeable operation upon highway pavements, city streets, and/or railway roadbeds.

Another object is to provide means whereby such vehicles may be automatically steered by the rails of railways when operating thereon.

Another object is to so arrange the steering means that the manual or automatic steering means may be selectively used according to the roadway upon which the vehicle is being operated.

Another object is to arrange the steering means so that the vehicles may be selectively steered from either end to avoid the necessity of turning the whole vehicle when the direction of travel is reversed.

Another object is to so construct and arrange the vehicle that a plurality of such vehicles can be coupled together and operated in train formation, or uncoupled and each unit operated separately.

Another object is to provide for driving and steering the traction wheels individually but in synchronism with each other, either manually or by the automatic control of pilot trucks engaging the railway rails as desired.

Another object is to cause the body of a driven or trailing vehicle to automatically steer its supporting truck or trucks.

Another object is to steer the wheels of a vehicle so that all the wheels on the same side will be tangential to the same arc.

A further object is to provide independent resilient suspension or springing for each wheel of the vehicle. (See patent issued to Hirschler, entitled "Hydropneumatic suspension systems", No. 1,934,764, dated Nov. 14, 1933, and assigned to me.

Other objects and advantages will appear as the description progresses.

In this specification and the accompanying drawings, the invention is disclosed in its preferred form. But it is to be understood that it is not limited to this form because it may be embodied in modifications within the purview of the claims following the description.

In the three sheets of drawings:

Fig. 5 is an enlarged vertical section through the wheel mounting (see V—V, Fig. 4).

Fig. 6 is an enlarged detail in vertical section taken along the line VI—VI in Fig. 5 showing the wheel suspension, with the hydropneumatic cylinder partially in vertical section.

Figure 1:
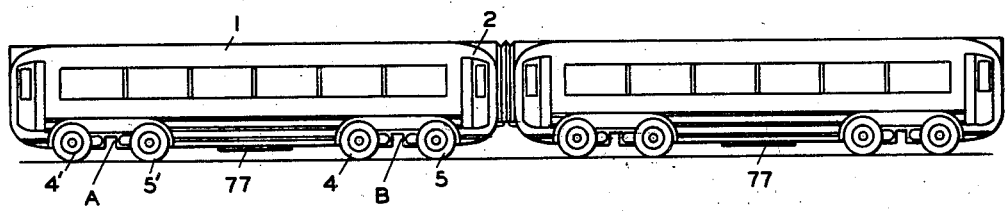
Fig. 1 is a side elevation of a plurality of motorbuses coupled together and operable in accordance with this invention.

In detail, the construction illustrated in the drawings, referring first to Fig. 1, comprises a motorbus having any desirable type of body 1, vestibuled or not as at 2. The body 1 is preferably mounted upon two four wheel trucks A and B, located at the front and rear ends respectively. These trucks are alike and are cross connected for manual steering in synchronism; for that reason one truck only will be described in detail, the same reference numerals being used on duplicated parts with the addition of the prime sign (') on the parts of the one truck. While two four wheel trucks, as shown, are preferred for heavy traffic, a pair of two wheel trucks or one four wheel truck is equally operative for the lighter types of vehicles.

Each of the traction wheels is provided with the conventional pneumatic truck tire, such as 4, 5, 6, and 7. Each wheel is journaled on a conventional steering knuckle, as at 8, 9, 10, and 11. These steering knuckles are vertically pivoted in the yoke brackets 8', 9', 10', and 11' swiveled in the ends of the independent suspensions arms 12, 13, 14, and 15 respectively pivoted on the main frame 16, as at 17, 18, 19, and 20. (See Fig. 6.) These pivots are mounted adjacent their respective cylinders 21, 22, 23, and 24 that are integral with the main frame. Each pivot has an arm 25 thereon bearing under the bottom of a piston 26 that is spring depressed within the cylinder, whereby the oil within the piston and cylinder is displaced against air pressure maintained within the sump 27, whereby road shock against any of the wheels is absorbed by its pneumatic oil suspension. For further particulars see the Hirschler patent above referred to.

This type of hydropneumatic suspension is merely suggestive. The conventional spring suspension common to automotive practice is equally applicable in accomplishing the same object.

To maintain the caster pin of the steering knuckle substantially vertical, the radius rod 8" is pivoted at 9" on the truck frame. The opposite end of the radius rod is pivoted on the bracket 8' having the yoke supporting the steering knuckle.

The wheels are driven in pairs by their respective shafts 28, 29 having the universal joints 30, 31, 32, and 33 interposed therein. The inner ends of other universal joints such as 36 are interposed between the outer ends of these shafts and their respective wheels to enable independent steering of the wheels as later described. These shafts are driven by their respective differential gearing within the housings 34 and 35. Each differential is driven by a pinion on the shaft of the motors 40 and 41 respectively. In this manner the several wheels are independently suspended for free action vertically within the limits of the shock absorbing means, such as the cylinders 21—24; and each wheel is capable of independent steering through the steering knuckles 8—11 respectively.

Figure 2:
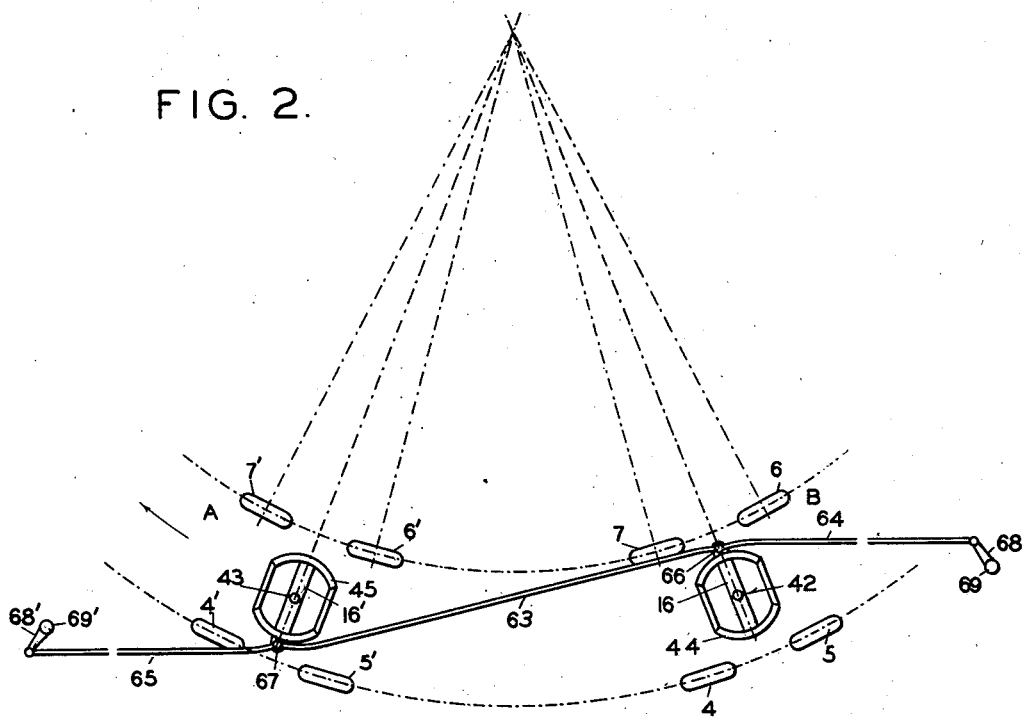
Fig. 2 is a diagram illustrating the relative positions of the traction truck parts in rounding a curve.

The main frames 16 and 16' have the central king pins 42 and 43 respectively, with the concentric "fifth wheel" turntables 44 and 45 registering with similar turntables on the body 1 to permit the trucks A and B to track in rounding turns in the roadway. (See Fig. 2.)

The several steering knuckles 8—11 have the steering arms 46, 47, 48, and 49 with the pivotal links 50, 51, 52, and 53 engaging the steering pivots 54 fixed to the under side of the body at its opposite ends and eccentric to the kingpins 42 for causing the multiple wheels to turn with any change of direction of the body 1. The placement of the steering pivots 54 with respect to the steering knuckles 8—11 is determined by the wheel base of the trucks and the length of the body 1 to negotiate any desired radius of curve. The lengths of the steering arms 46—49 can be proportioned to give the desired ratio of leverage to cause all the wheels on the same side to travel tangentially to the same arc, as in railway practice, which facilitates turning and reduces tire wear.

To show the adaptability of this invention: The vehicle is equipped with traction trucks at each end in tandem, but in vehicles with a relatively short wheel base, one extended truck chassis with but four wheels to the vehicle will operate with even greater facility because of the simplified manual steering gear.

The wheels are normally alined with the longitudinal centers of their respective truck frames 16 and 16'; when these trucks are turned right or left on their respective king pins 42 and 43, the links 50—53 cause the wheels to synchronously turn with respect to the main frames 16 and 16' and the body 1.

These main frames 16 and 16' are manually steered from either end of the body 1 by means of the oblique link 63 pivoted at 66 and 67 on their respective truck frames 16 and 16', to cause the trucks A and B to turn in unison in rounding a turn when either truck is turned. The extensions 64 and 65 of the drag link 63 are pivoted to their respective steering levers 68 and 68' respectively pivoted at 69 and 69' on the opposite ends of the body 1, and oscillated by a steering column, not shown, which may be transferred from one end of the body 1 to the other. When the steering wheel column is turned manually in either direction, the drag links 64 and 65 cause the trucks A and B to respond accordingly when traveling on the highway.

Figure 3:
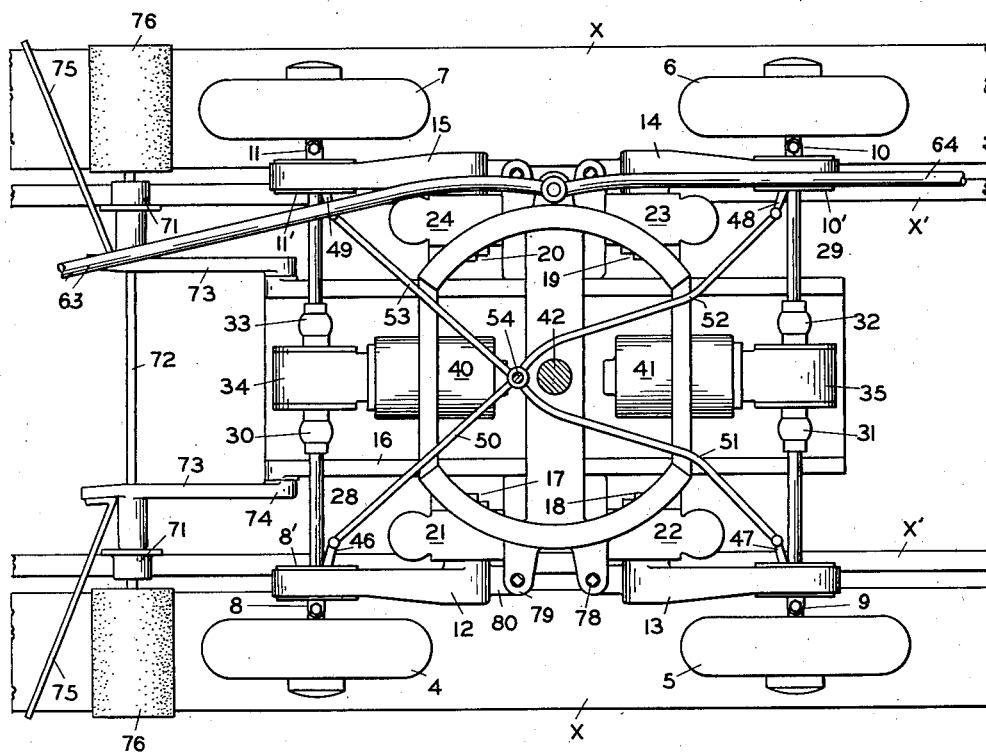
Fig. 3 is a diagrammatic plan view of one of the traction trucks for supporting the body of the vehicle and the manner of steering the vehicle.
Figure 4:
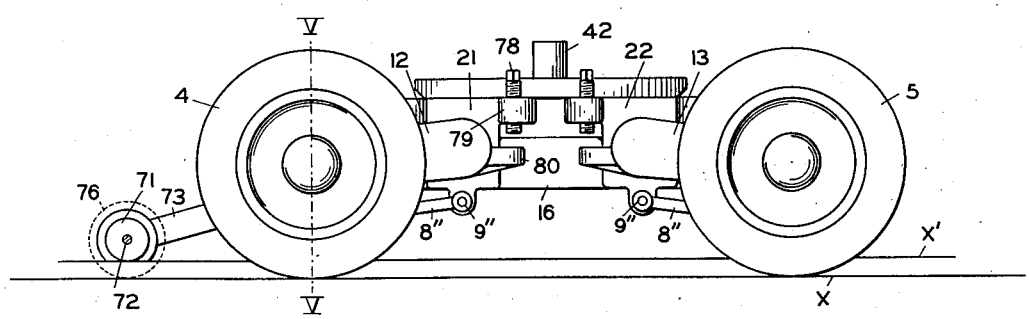
Fig. 4 is a side elevation of the same.

When the motorbus is traveling upon a "dual traffic way" provided with treadways X combined with the rails X' of a railway constructed in accordance with my copending application entitled Railways, bearing Serial Number 133,600, filed March 29, 1937, the steering is automatically accomplished by retractable pilot trucks engaging the railway rails. (See Figs. 3 and 4.) These trucks have the flanged wheels 71—71 fixed on the axle 72 journaled in the brackets 73—73 pivoted to the truck frames 16 and 16' at 74. These pilot trucks cause the supporting traction trucks A and B to follow the rails X' of the railway independent of the manual steering gear previously described, the turning of the truck frames causing the traction wheels to respond to the cross linkages 50—53.

When the leading truck A in the train is steered, either manually or by the link 65, or automatically by the pilot truck 73, the cross link 63 swings the second truck B on its king pin 42. The steering pivot 54, being fixed on the body of the coach 1, is independent of and eccentric to the king pin 42; therefore the swing of the second truck B, acting through the links 50—53, will cause the truck wheels 4—6 to aline with the arc of the curve as the train swings around a turn, whereby the wheels are steered by the relative movement between the truck B and the body 1, or vice versa, depending upon whether the train is standing or in motion. The same is true whichever direction the coach or train is moving. All truck wheels being similarly linked to the body of the supported body, all wheels on the same side of the coach or train will assume positions tangential to the same arc of the turning curve, see Figs. 2, 3. The direction of travel is selective; but the steering of the succeeding wheels is automatic and synchronous with whichever truck, A or B, is selected as the leader.

To remove accumulations of snow or sand from the treadways X, the oblique scrapers 75—75 are fixed to the opposite brackets 73 to deflect the obstruction from the treadways. To further clear the treadways and insure tractive efficiency, the rotary brushes 76—76 are fixed to the opposite ends of the axle 72 and revolve therewith to sweep the top surfaces of the treadways X clean.

The spindles 78 threaded in the brackets 79 on the truck frame and, engaging the lugs 80 on the adjacent suspension arms, provide means for lifting the wheels for changing a tire, provided the remaining tires on the truck are inflated.

These motor vehicles are preferably powered with Diesel-electric drive which may be mounted in the side of the body 1 as indicated at 77 in Fig. 1. The electric power from the motor generator set is wired to the several electric motors 40 and 41. It is obvious, however, that electric power may be derived from the conventional trolley systems; or mechanical power may be transmitted from the prime mover of the tractive elements through the transmission gearing common to motor trucks, without departing from the spirit of the invention.

The construction and operation of motor-generator sets for the electrical propulsion of ships and land vehicles is well known to those skilled in the art, for that reason non-essential details have been omitted from the present disclosure, since the type of propulsion for the present purpose is optional.

In the interest of clarity in this disclosure, specific braking means is omitted and a simple form of mechanical manual steering is schematically shown. It is proposed, however, to use hydraulic, electric, or other suitable means for power steering the vehicles because of their weight and high speed, to relieve the driver from fatiguing physical effort and insure greater safety of operation.

Having thus described the invention, what is claimed and desired to be secured by Letters Patent is:

1. A plurality of vehicles coupled together in train formation, each vehicle having a body; vertical king-pins at each end of said bodies respectively; a pair of tandem trucks under each body each having a frame engaging said king-pins respectively; a draglink having its opposite ends pivoted to the right and left sides of said trucks respectively; a plurality of traction wheels mounted upon steering knuckles on said trucks respectively; steering pivots on said bodies adjacent and eccentric to each of said king-pins respectively; links engaging said pivots and extending to each of said steering knuckles respectively, whereby the supporting wheels are automatically steered by the lateral turning of the said body which they support; and means for swinging the front truck of the leading vehicle upon its respective king-pin.

2. A vehicle having a body; vertical king pins at each end of said body respectively; a pair of tandem trucks each having a frame engaging said king pins respectively; a draglink having its opposite ends pivoted to the right and left sides of said trucks respectively; a pilot truck on the leading truck frame and adapted to engage a guide rail on the road supporting said truck; steering knuckles on each of said trucks; a traction wheel mounted upon each of said knuckles; steering pivots on said body adjacent and eccentric to each of said king pins respectively; links engaging said pivots and extending to each of said steering knuckles respectively; whereby the wheels on the other truck are steered in synchronism with the wheels on the truck being steered by said pilot truck.

JOSEPH B. STRAUSS.